W. L. OGDEN.
ICE CREEPER FOR HORSESHOES.
APPLICATION FILED DEC. 2, 1908.
917,481.
Patented Apr. 6, 1909.
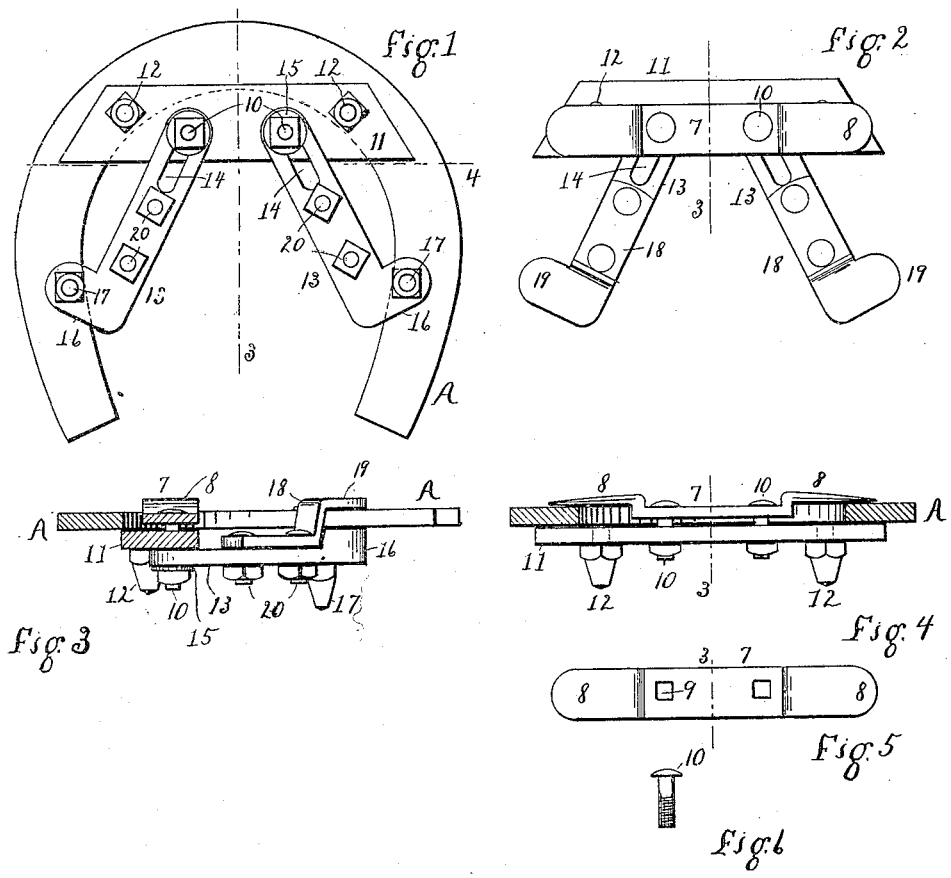
Witnesses
Inventor
William L. Ogden
By J. A. Rosen atty

_UNITED STATES PATENT OFFICE._

WILLIAM L. OGDEN, OF BURLINGAME, KANSAS.

ICE-CREEPER FOR HORSESHOES.

No. 917,481.     Specification of Letters Patent.     Patented April 6, 1909.

Application filed December 2, 1908. Serial No. 465,642.

*To all whom it may concern:*

Be it known that I, WILLIAM L. OGDEN, a citizen of the United States, residing in Burlingame, in the county of Osage and State of Kansas, have invented a new and useful Improvement in Ice-Creepers for Horseshoes, of which the following is a specification.

It is the object of my invention to provide an adjustable ice-creeper for horse-shoes which may be attached to and detached from the animal without disturbing the shoe, and by so simple a method that it may be manipulated by any person and done in a short time in the stable or elsewhere without going to the horse-shoer; also to provide such an ice-creeper which has a range of adjustment so as to be applicable to various sizes, styles, and shapes of horse-shoes; also to provide such an ice-creeper which may be adjusted to tilt the hoof more or less as may be desired and still give the animal a firm footing.

To this end my invention comprises a plate adapted to be inserted between the shoe and the hoof, another plate fitting under the shoe, and two screws or bolts spaced apart and securing the under plate to the upper plate, said under plate being provided with calks.

It also comprises such an arrangement combined with rearwardly extending wings secured to said screws or bolts and clamped to the shoe back of the said plates and also provided with calks.

It also consists of the parts, improvements, and combinations herein set forth and claimed.

In the drawings accompanying and forming part of this specification and in the description of the drawings, I have shown my invention in its preferred form, and have shown what I deem to be the best mode of applying the principles thereof; but it is to be understood that, within the scope of the appended claims, I contemplate changes in form, proportions, and materials, the transposition of parts, and the substitution of equivalent members, without departing from the spirit of the invention.

Figure 1 is a bottom view of my ice-creeper attached to a horse-shoe, it being understood that in this specification I refer to the side next the ground as the bottom or under side. Fig. 2 is a plan view of my improved ice-creeper detached from the horse-shoe, showing the side opposite to that shown in Fig. 1. Fig. 3 is a sectional view through the line 3 of Figs. 1, 2, 4, and 5. Fig. 4 is a sectional view on the line 4—4 of Fig. 1. Fig. 5 is a top view of the upper clamping plate of that portion. And Fig. 6 is a view of one of the bolts.

Similar reference characters indicate like or corresponding parts throughout the several views.

A represents a horse-shoe of any kind.

7 is an upper clamping plate whose ends 8 project slightly upward and are chamfered off to a rather blunt edge so that the plate may be pressed in between the hoof and the shoe, or removed therefrom, without taking off the shoe. Spaced apart in the plate are the two angular holes 9, 9, through which may be extended the bolts 10, 10 provided with flat or rounded heads and correspondingly angular shoulders, so as to fit non-rotatably therein and so as to give an even upper face for the device.

11 is an under plate adapted to span the horse-shoe and secured by means of the bolts 10, 10, and provided with the calks 12, 12, which, though they may be of any suitable kind, are preferably of the kind shown, being screwed into said plate and having hardened centers, being thus durable and also capable of renewal as they wear out by unscrewing the worn-out one and screwing in a new one.

As indicated the device may be applied to the hoof by pressing the ends of the upper plate in between the shoe and the hoof, and then applying the lower plate and tightening the nuts. By using two bolts, the device will be held securely in place making twisting of the lower plate impossible. The device so far described may be used alone, as shown in Fig. 4, or it may be used with supplemental devices, as shown in Figs. 1, 2, and 3.

13, 13 are two bars, each of which has a slot 14 by which it may be secured to the bolt 10 with an allowance for a longitudinal adjustment. When the bars are used it is well also to use a washer 15, as indicated. Each bar has a laterally-extending offset 16 which is adapted to bear on the under side of the shoe back of the plate 11 and is provided with a calk 17. To the upper side of each bar is attached a clamping plate 18 of a contour corresponding to that of the rearward portion of the bar, the end thereof, 19, being chamfered off similarly to the end 8 of the plate 7, so that said end may be pressed in between the hoof and the shoe. The bar and the clamping plate are secured together and clamp the side of the shoe between them by means of the two bolts 20, which are non-rotatably passed through the clamping plate 18 as the screws or bolts 10 are passed through the plate 4.

It will be noted that the ends 16 of the bars are thick and that the calks 17 project farther than the calks 12; and this gives the animal not only a broader foundation, but also one that permits of a degree of rocking, and permits the animal to secure a firm hold both at the toe and also farther back. The slots permit adjustment to bring the calks closer together or farther apart, at will. Also the bars and their calks and clamps serve to make a firmer clamp of the ice-creeper on the shoe, making it impossible for them to be accidentally displaced. On the other hand, by loosening the nuts, the ice-creeper may easily be removed from the shoe. And it is an important feature of my invention that it may be applied to any kind of shoe by simple operation, without the usual resort to the horse-shoer. It should also be noted that the calks preferably bear directly on the under side of the shoe. While each ice-creeper is adapted to a rather wide range of adjustability, yet I contemplate making the device in several sizes, giving to each a limited range of adjustment, in order to secure the best results. It will also be noted that with my construction, the calks may be located inwardly from the outer edge of the shoe, so that the animal will not strike or otherwise injure himself.

What I claim is:

1. The combination of an upper clamping plate having chamfered-off ends adapted to be inserted between the hoof and the shoe, an under plate adapted to span the shoe on the under side thereof, bolts non-rotatably secured to the upper plate and extending through the under plate and provided with nuts for clamping said plates to the shoe, a pair of rearwardly extending bars, each bar having a calk and also having a slot whereby it is adjustably secured to one of said bolts and a calk, its rearward end having a lateral projection adapted to bear against the under side of the shoe, and a clamping plate secured to the upper side of each bar and provided with a corresponding lateral projection which is chamfered off and adapted to be inserted between the hoof and the shoe, for clamping said bar to the quarter of the shoe.

2. The combination of an upper clamping plate having chamfered-off ends adapted to be inserted between the hoof and the shoe, an under plate adapted to span the shoe on the under side thereof, bolts non-rotatably secured to the upper plate and extending through the under plate and provided with nuts for clamping said plates to the shoe, a pair of rearwardly extending bars, each bar having a calk and also having a slot whereby it is adjustably secured to one of said bolts, and devices for securing said respective bars to the quarters of the shoe.

3. The combination of an upper clamping plate having ends adapted to be inserted between the hoof and the shoe, an under plate adapted to span the shoe on the under side thereof, bolts for securing said plates together on the shoe, a pair of bars secured to said plates so as to be capable of longitudinal adjustment, each bar having a calk and also having a means for securing it to the quarter of the shoe.

4. The combination of an upper clamping plate having ends adapted to be inserted between the hoof and the shoe, an under plate adapted to span the shoe on the under side thereof, bolts for securing said plates together on the shoe, a pair of bars secured to said plates and extending rearwardly therefrom, each bar having a calk and a means independent of the other bar for securing it to the quarter of the shoe.

In testimony whereof I have hereunto set my hand in the presence of witnesses.

WILLIAM L. OGDEN.

Witnesses:
G. W. PRATT,
WYATT ROUSH.